United States Patent [19]

Michaud et al.

[11] Patent Number: 5,057,055
[45] Date of Patent: Oct. 15, 1991

[54] SAUSAGE LINK HANDLING AND PACKAGING MACHINE

[75] Inventors: Ghislain Michaud; Michel Presseau, both of Laval; Roger Drolet, Mascouche, all of Canada

[73] Assignee: D M P Industries Inc., Laval, Canada

[21] Appl. No.: 522,916

[22] Filed: May 14, 1990

[51] Int. Cl.$^5$ .......................... A22C 11/62; B65B 5/06
[52] U.S. Cl. ........................ 452/51; 452/182; 53/148; 53/517
[58] Field of Search ............... 452/51, 182, 35, 46; 53/517, 148, 444, 235; 426/392

[56] References Cited

U.S. PATENT DOCUMENTS

| | | | |
|---|---|---|---|
| 4,386,490 | 6/1983 | Griffith et al. | 53/148 |
| 4,633,652 | 1/1987 | Dagenais et al. | 53/444 |
| 4,671,042 | 6/1987 | Moekle et al. | 53/517 |

Primary Examiner—Willis Little

[57] ABSTRACT

A sausage link handling and packaging machine which comprises a feed conveyor for receiving individual sausage links from a link forming machine and for transferring them onto a main conveyor. These sausage links are transferred in a guided manner whereby to orient them on a predetermined ejecting path. When the sausage links arrive at the receiving end of the main conveyor, they are oriented in a side-by-side transverse alignment relationship. A transfer device is provided at a transfer station along the main conveyor to transfer a predetermined number of the transversely aligned sausage links off the conveyor and onto a package support element. The package support element with the predetermined number of sausage links thereon are then conveyed downstream of the transfer station for further handling.

11 Claims, 3 Drawing Sheets

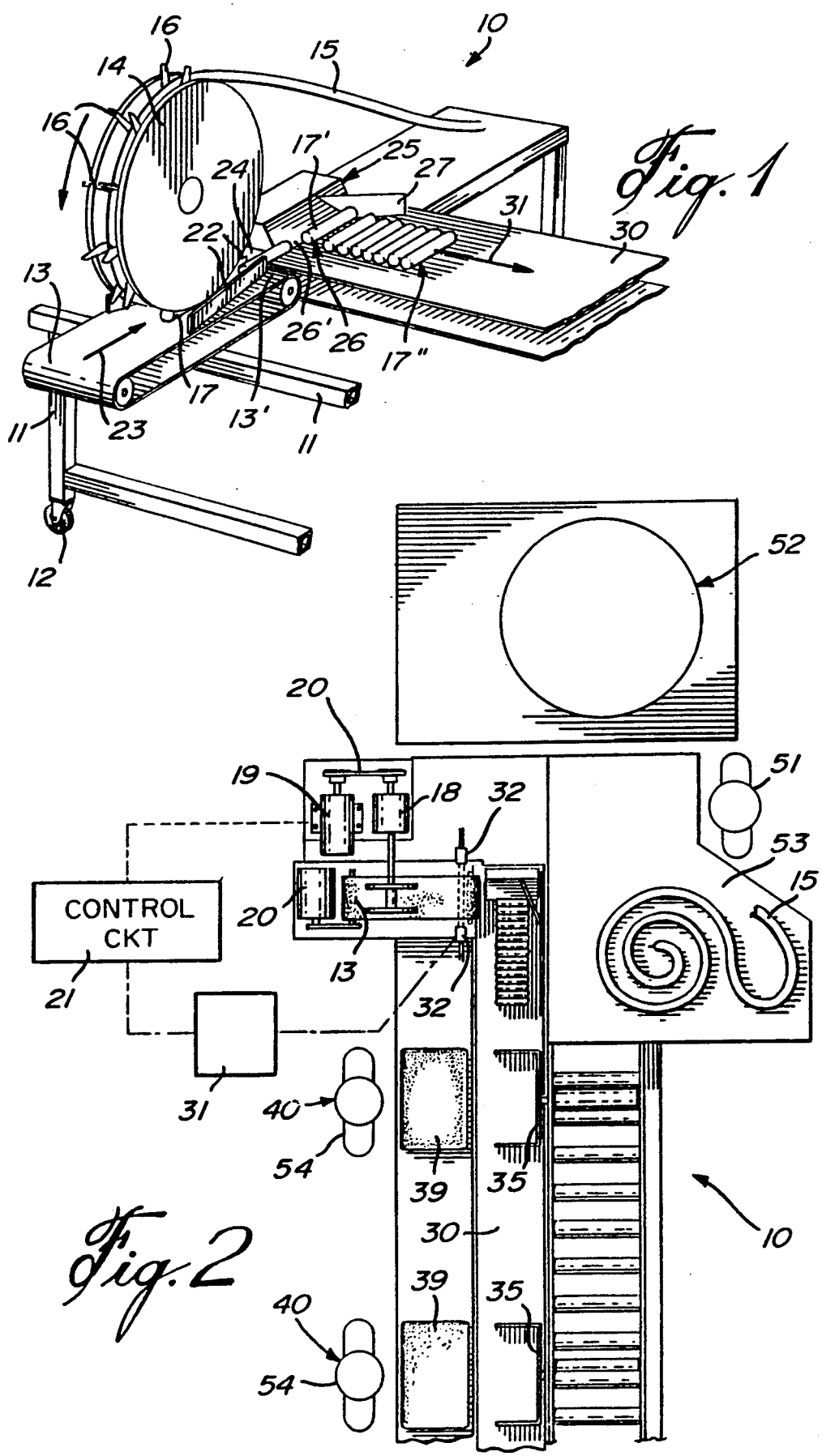

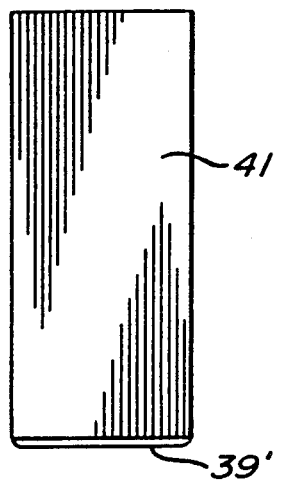
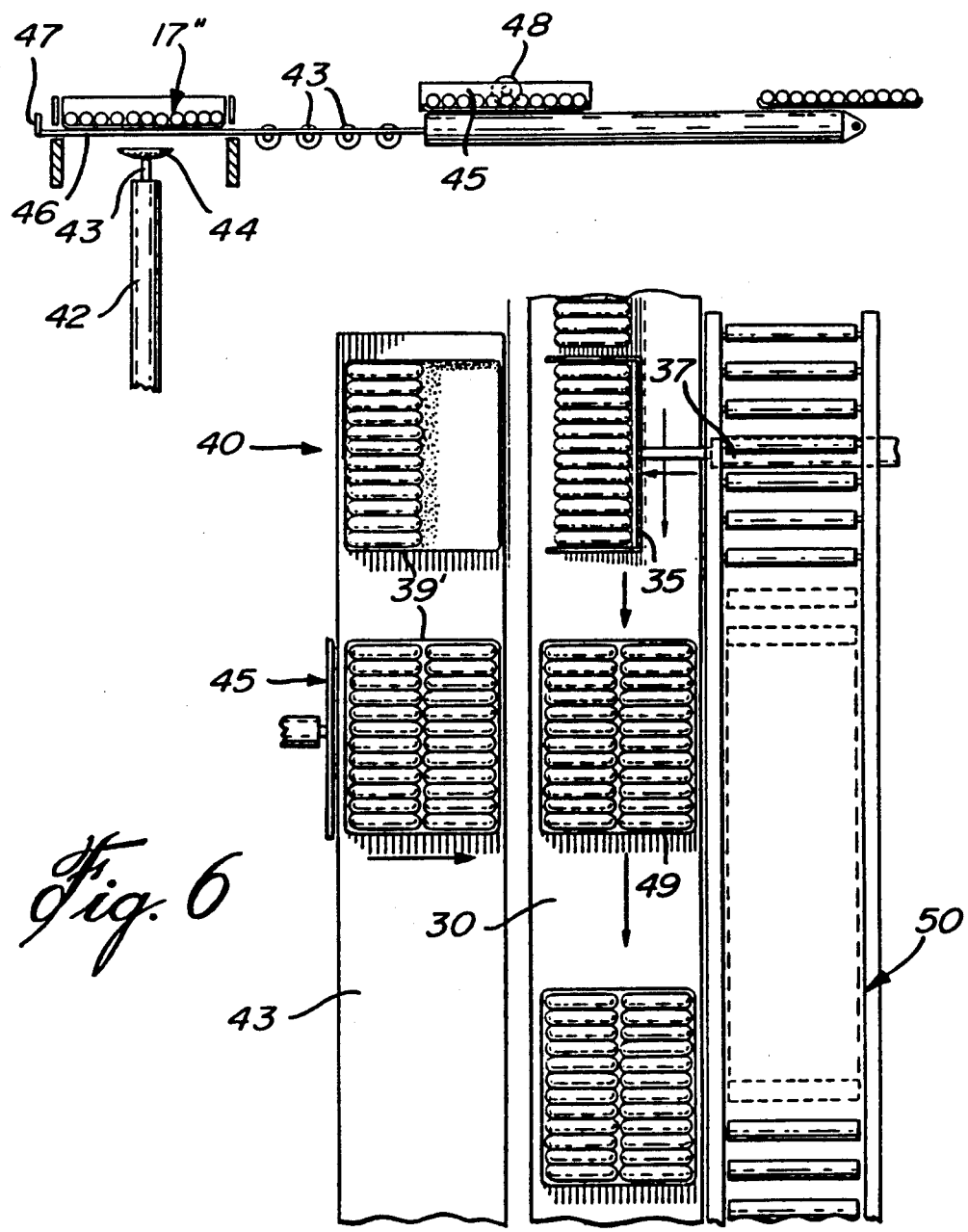
Fig. 5
Fig. 6

SAUSAGE LINK HANDLING AND PACKAGING MACHINE

BACKGROUND OF INVENTION

1. Field of the Invention

The present invention relates to a sausage link handling and packaging machine whereby predetermined quantities of sausage links are aligned in groups and transferred on a support element which is used to package the sausage links.

2. Description of Prior Art

A common method of packaging sausage links in the trade is to provide a long conveyor on which sausage links are deposited at one end and then picked up at several locations along the long conveyor by people so as to position predetermined quantities of sausage links into a box or on a tray which is to be wrapped by a plastic film material. A disadvantage of such method and apparatus is that it is labor-intensive, it is subject to human errors, and requires added sanitary precautions due to the handling of the foodstuff by the packaging people. Another disadvantage of these prior art devices is that many of the sausages become damaged by dumping them in a random fashion at a receiving end of the conveyor. These sausages usually consist of soft meat packaged within a transparent fragile film-like tube, with the ends of the tubes being only partly closed. Therefore, if the sausage link is squeezed during handling, the foodstuff can escape from the end of the tubes and this results in a messy package being formed or creates a messy and unsanitary conveying surface.

SUMMARY OF INVENTION

It is therefore a feature of the present invention to provide a sausage link handling and packaging machine which substantially overcomes the above-mentioned disadvantages of the prior art.

Another feature of the present invention is to provide a sausage link handling and packaging machine wherein the sausage links are automatically fed to a receiving end of a main conveyor and automatically oriented in alignment and in side-by-side relationship by a deflector and stopper plate arrangement and then conveyed along a predetermined path and further wherein a predetermined number of these sausage links are transferred onto a package support element.

Another feature of the present invention is to provide a sausage link handling and packaging machine wherein sausage links are disposed in predetermined groups with the groups spaced apart along a main conveyor whereby individual groups are transferred onto a package support element.

According to the above features, from a broad aspect, the present invention provides a sausage link handling and packaging machine which is comprised of a feed conveyor for receiving individual sausage links from a link forming machine. The feed conveyor transfers the sausage links onto a main conveyor. Guide means is associated with the transfer conveyor to orient the sausage links on an ejecting path. Alignment means is provided at the receiving end of the main conveyor for orienting the sausage links in a side-by-side transverse aligned relationship on the main conveyor. Transfer means is provided at a transfer station of the main conveyor for transferring a predetermined number of the transversely aligned sausage links off the main conveyor and onto package support means. Means is further provided to convey the package support means with the sausages thereon downstream of the transfer station.

BRIEF DESCRIPTION OF DRAWINGS

A preferred embodiment of the present invention will now be described with reference to the accompanying drawings in which:

FIG. 1 is a fragmented perspective view showing the position of the feed conveyor with respect to the main conveyor and the ejection and orientation of the sausage links for later packaging;

FIG. 2 is a top view showing a portion of the sausage link handling and packaging machine of the present invention;

FIG. 5 is a side view showing an embodiment of means to handle the package support elements on which a predetermined number of sausage links are positioned; and FIG. 6 is a top view showing an arrangement as illustrated in FIG. 5.

DESCRIPTION OF PREFERRED EMBODIMENTS

Figure 3:
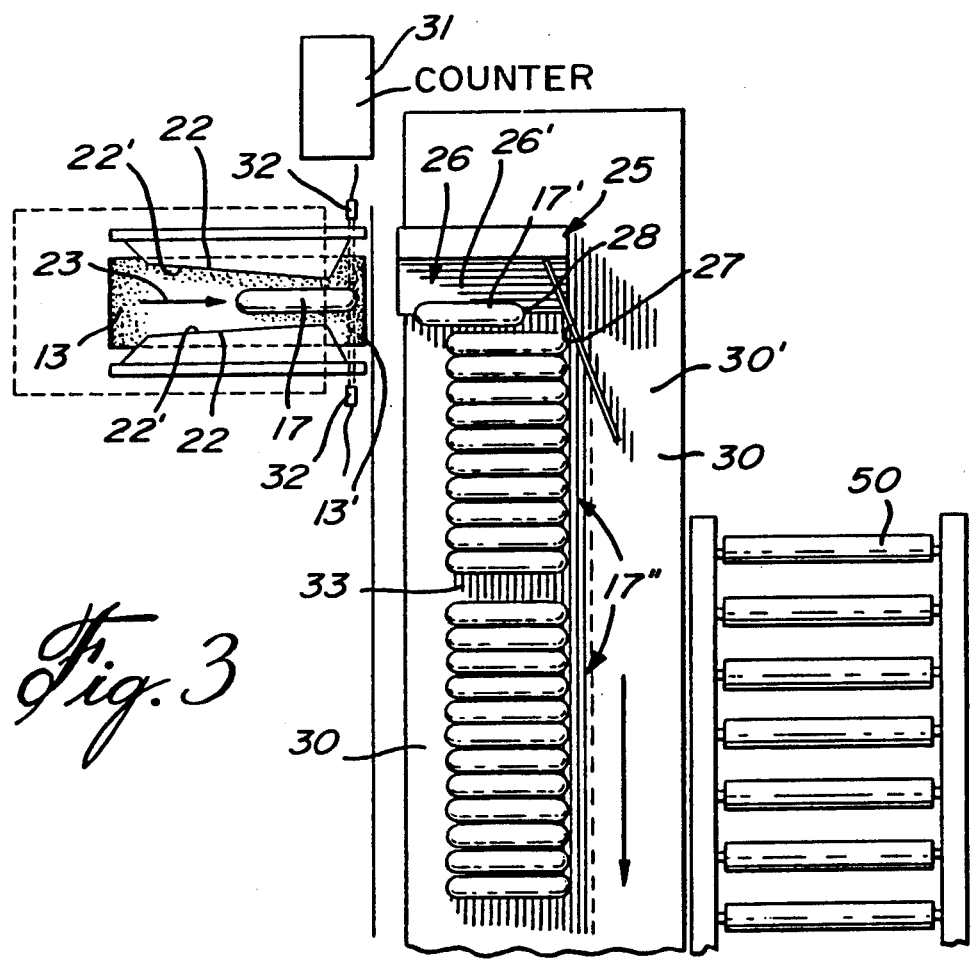
FIG. 3 is a top view similar to FIG. 2 but showing the orientation of the sausage links on the main conveyor as well as on a package support element, herein a box or a tray.

Referring now to the drawings, and more particularly to FIGS. 1 and 2, there is shown generally at 10, the sausage link handling and packaging machine of the present invention. As herein shown, the machine is mounted on a displaceable frame 11 which is supported on casters 12 which are arrested by suitable brake means, well known in the art. The machine 10 comprises a feed conveyor 13 which is positioned under a sausage link forming machine 14 of a type well known in the art. An elongated casing 15 into which soft meat has been inserted is fed to the link forming machine and clasped between pairs of clasping and shearing elements 16 which form individual sausage links 17 which are severed and dropped under the link forming machine 14 and onto the feed conveyor 13. The link forming machine is well known in the art.

As shown in FIG. 2, the link forming machine 14 is provided with a drive gear box 18 driven by a motor 19 through a belt coupling 20. A further motor 20 drives the feed conveyor 13. A control circuit 21 is provided to control the speed of rotation of the link forming machine 14 and the speed of the feed conveyor which is driven at a higher speed than the link forming machine.

At the outlet end 13' of the feed conveyor, there is provided a pair of angled guide plates 22 supported above the feed conveyor for orienting the sausage links axially with respect to the conveying direction, as indicated by arrow 23, and along an ejection path which is aligned with the mouth opening 24 of the guide plates 22. Accordingly, sausage links, such as the link 17', are ejected along an airborne path and onto alignment means 25.

The alignment means 25 is an important part of the machine and is comprised of a side deflector plate 26 which is positioned on the ejecting path and has a sloped deflecting surface 26' sloping toward the direction of travel of a main conveyor 30 and as indicated by arrow 31. The alignment means is also comprised of a stopper plate 27 which is positioned adjacent the deflector plate 26 at a predetermined angle to cause the sausage links 17 to align themselves in side-by-side relationship, as shown at 17". FIG. 3 illustrates more clearly the angular relationship and the construction of the alignment means 25.

Referring additionally to FIG. 3, it can be seen that as the sausage link 17' strikes the sloped deflecting surface 26' of the deflector plate 26, its velocity is arrested and the sausage falls downwardly along the sloped deflecting surface 26' toward the stopper plate 27. Accordingly, the front end portion 28 of the sausage link, which is slightly open, will strike into the lower corner of the stopper plate and compact itself while forming a blunt end whereby to facilitate packaging by maintaining the links substantially the same length. The links are then deposited by gravity onto the top surface 30' of the main conveyor 30 and be conveyed therefrom. Accordingly, all of the links are assembled in side-by-side relationship as shown at 17" and the foodstuff is prevented from falling out of the casing because of the arresting wall provided by the stopper plate. Also, the sloped surface 26' provides arresting friction to slow down the sausage link so it doesn't hit the stopper plate at a high velocity but provides for the link to be gently deposited against the stopper plate.

As is better seen in FIG. 3, the guide plates 22 are positioned spaced apart from one another on a respective side of the feed conveyor 13 and are provided with angulated vertical guide surfaces 22'. It is conceivable that only one of these guide plates may be provided as the links are usually deposited by the link forming machine in substantially axial alignment with the machine direction of the conveyor 13. A counter 31 is also mounted adjacent the output end 13' of the feed conveyor 13 and optical detecting devices 32 are connected thereto and aligned with the outlet end 13' whereby to detect individual ones of the sausage links 17 being ejected by the feed conveyor. The counter 31 is connected to the control circuit 21 to provide input signals thereto so that the control circuit may momentarily stop the feed conveyor after a predetermined number of sausage links have been ejected so as to provide the spacing 33 between the groups of sausages 17" as shown in FIG. 3.

Figure 4:
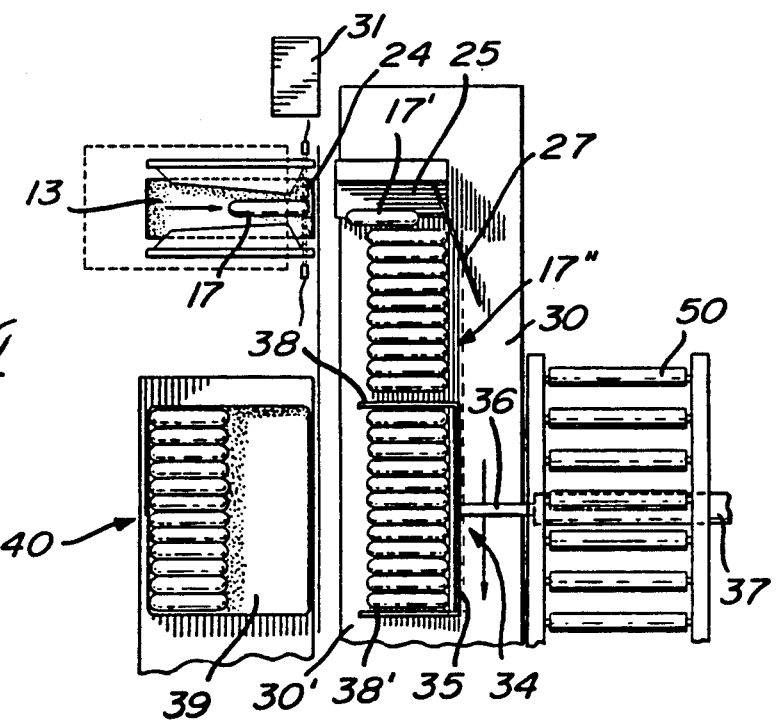
FIG. 4 is a view similar to FIG. 3 but showing the transfer pusher plate and piston.

Referring now additionally to FIGS. 3 to 6, it can be seen that as the groups of sausage links 17" move downstream on the main conveyor 30 that these groups of sausage links arrive at a transfer station 34 where there is herein provided a piston actuated pusher plate 35 connected to the end of the piston rod 36 of piston 37. The pusher plate 35 may be provided with side walls 38 or at least the side wall or a guide wall on the downstream side of the conveyor 30, namely guide wall 38', to momentarily arrest the sausage links on the main conveyor during the transfer thereof. It is pointed out that the main conveyor is provided with a top surface 30' which has a low coefficient of friction and is treated with a sanitary material. Accordingly, the pusher plate 35 transfers a group of sausage links 17", oriented in a side-by-side fashion as shown in FIG. 4, transversely onto a package support means which could be a tray or the lower wall of a box, as illustrated at 39 at a packaging station 40. This transfer is effected very quickly so that the pusher plate can come back to its initial position before the first sausage link of the next group of sausage links 17" arrive at the transfer station 34. Alternatively, in the retracting stroke, the pusher plate may be lifted above the path of travel of the groups of sausage links not to interfere with them and then down to position itself close to the conveying surface of the main conveyor to push the next group of sausage links onto the box or tray surface 39. As shown in FIG. 4, the box support surface 39 can accept two groups of sausage links in side-by-side relationship. The pusher plates 35 are operated by foot switches or automatically by sensors (not shown) which detect the sausage groups 17".

FIGS. 5 and 6 illustrate another embodiment whereby to package the groups of sausage links 17" onto a plastic foam tray, as is well known in the art. In order to do this, a tray holder 41 is disposed above the packaging station 40 and a pick-up cylinder 42 is positioned in alignment below the tray holder and below a roller conveyor 43 or table and positioned adjacent the main conveyor 30 (see FIG. 6). The pick-up cylinder has a piston rod 43, the end of which is provided with a suction cup 44 which in a pick-up stroke extends through a hole in the roller conveyor 43 onto the lower one of the trays 39' on the tray holder 41 and retains it by vacuum pressure applied to the cup in a well known fashion. Accordingly, the tray 39' is brought down to a loading position and held there by the vacuum while it is being loaded by the pusher plate 35, as described with reference to FIG. 4. After the loading of the group of sausage links 17" onto the tray 39', the suction is removed and the tray is displaced to a repositioning station 45 by means of a transfer piston rod 46, herein schematically illustrated. The piston rod 46 has a retracting plate 47 at an end thereof which will draw the loaded tray to the station 45 where a further cylinder 48 is actuated to push the tray 39' back onto the main conveyor 30, such as at position 49 as indicated in FIG. 6. The tray with the sausage links is then conveyed downstream for film wrapping and weighing. A roller conveyor 50 may be positioned adjacent the main conveyor 30 and on which accessories or defective products may be positioned.

It is pointed out that with the present invention, very few operators are required to package the sausage links onto trays or into boxes and the operators serve primarily a supervising function. As shown in FIG. 2, an operator may be provided such as at 51 whereby to transfer the filled casings 15 onto the link forming machine 14. It is pointed out that these casings 15 may have a length of some eighty feet. A casing forming machine 52 is preferably positioned adjacent the casing support plate 53 where the operator 51 is located. Because the machine of the present invention is mounted on casters, it can be conveniently located anywhere. It can also be utilized in a semi-automatic mode of operation wherein operators 54 may be positioned along the main conveyor 30 with each operator selecting a specific group of sausage links and placing same into trays 39 positioned in front of them. Once the trays 39 are filled with sausage links, they are then positioned on the roller conveyor 50 or another conveyor to convey the trays to a wrapping and weighing station. A transfer pusher plate 35 could alo be located adjacent each of the manual packaging stations 40 and operate as previously described.

It is within the ambit of the present invention to cover any obvious modifications of a preferred embodiment, provided such modifications fall within the scope of the appended claims.

We claim:

1. A sausage link handling and packaging machine, said machine comprising a feed conveyor for receiving individual sausage links from a link forming machine and transferring same onto a main conveyor, guide means associated with said transfer conveyor to orient said sausage links on an ejecting path, alignment means at a receiving end of said main conveyor for orienting said sausage links in a side-by-side transverse aligned relationship on said main conveyor, said alignment means being comprised of a side deflector plate positioned in said ejecting path and having a sloped deflecting surface sloping toward the direction of travel of a conveyor belt of said main conveyor, and a stopper plate positioned adjacent said deflector plate at a predetermined angle to cause said sausage links to align themselves in said side-by-side relationship, tranfer means at a transfer station of said main conveyor for transferring a predetermined number of said transversely aligned sausage links off said main conveyor and onto package support means, and means to further convey said package support means with said sausages downstream of said transfer station.

2. A sausage link handling and packaging machine as claimed in claim 1 wherein said stopper plate is angled towards said ejecting path to deflect and guide a front end of said sausages ejected on said deflector plate downwards toward said conveyor belt.

3. A sausage link handling and packaging machine as claimed in claim 2 wherein said guide means is comprised by at least one angled guide plate supported above said feed conveyor at least adjacent an output end thereof for orienting said sausage links axially with respect to the conveying direction along said ejecting path.

4. A sausage link handling and packaging machine as claimed in claim 3 wherein there are two of said angled guide plates positioned spaced from one another on a respective side of said feed conveyor, said guide plates having vertical guide surfaces which are closer to one another at said output end.

5. A sausage link handling and packaging machine as claimed in claim 3 wherein there is further provided counter means disposed at said output end of said feed conveyor to count the number of sausage links ejected by said feed conveyor.

6. A sausage link, handling and packaging machine as claimed in claim 5 wherein said counter means has a detector for detecting the passage of each sausage link, said detector being connected to a counter device, and a control circuit to monitor said counter device and control the operation of said feed conveyor so as to interrupt the ejection of sausage links whereby to form separated groups of sausage links on said main conveyor.

7. A sausage link handling and packaging machine as claimed in claim 2 wherein said transfer means is a piston actuated pusher plate positioned adjacent said main conveyor at said transfer station to push said predetermined number of sausage links transversely off said main conveyor, transfer guide means positionable at least to one side of a downstream one of said predetermined number of sausage links to momentarily arrest said links on said main conveyor during the transfer thereof.

8. A sausage link handling and packaging machine as claimed in claim 7 wherein said package support means is the bottom wall of a box.

9. A sausage link handling and packaging machine as claimed in claim 7 wherein said package support means is a tray, a plurality of said trays being positioned in a storage holder adjacent said main conveyor at said transfer station.

10. A sausage link handling and packaging machine as claimed in claim 9 wherein said storage holder is transfer station, and vacuum pick-up means to transfer one of said trays from said storage holder to said loading position.

11. A sausage link handling and packaging machine as claimed in claim 7 wherein said means to further convey said package support means is comprised by said main conveyor and means to locate said package support means with said predetermined number of sausage links onto said main conveyor.

* * * * *